United States Patent
Sturm et al.

(10) Patent No.: US 12,526,462 B2
(45) Date of Patent: Jan. 13, 2026

(54) METHODS AND SYSTEMS FOR PROVIDING VIDEO AT MULTIPLE BIT RATES

(71) Applicant: Comcast Cable Communications, LLC, Philadelphia, PA (US)

(72) Inventors: Walter Sturm, Far Hills, NJ (US); Philip John Stroffolino, Media, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 17/179,913

(22) Filed: Feb. 19, 2021

(65) Prior Publication Data

US 2022/0272397 A1 Aug. 25, 2022

(51) Int. Cl.
*H04N 21/2662* (2011.01)
*H04N 21/235* (2011.01)
*H04N 21/24* (2011.01)

(52) U.S. Cl.
CPC ..... *H04N 21/2662* (2013.01); *H04N 21/2358* (2013.01); *H04N 21/2402* (2013.01); *H04N 21/2404* (2013.01)

(58) Field of Classification Search
CPC .......... H04N 21/2662; H04N 21/2358; H04N 21/2402; H04N 21/2404
See application file for complete search history.

(56) References Cited

U.S. PATENT DOCUMENTS

| 10,178,043 | B1 | 1/2019 | Ganjam et al. |
| 10,659,512 | B1* | 5/2020 | Nielsen ............... H04L 47/10 |
| 10,893,310 | B1 | 1/2021 | Wu et al. |
| 11,102,260 | B1* | 8/2021 | Wu ................. H04L 65/612 |
| 2007/0019687 | A1* | 1/2007 | Ruthstein .......... H03M 13/6368 370/537 |
| 2015/0106481 | A1 | 4/2015 | Ma et al. |
| 2015/0201042 | A1* | 7/2015 | Shah ................. H04L 65/765 709/219 |
| 2018/0376176 | A1 | 12/2018 | Matsumoto et al. |
| 2019/0238390 | A1 | 8/2019 | Martin et al. |
| 2022/0078492 | A1* | 3/2022 | Yang ................. H04L 65/1083 |

FOREIGN PATENT DOCUMENTS

WO 2014/022017 A1 2/2014

* cited by examiner

*Primary Examiner* — Joshua D Taylor
(74) *Attorney, Agent, or Firm* — BakerHostetler

(57) ABSTRACT

A user device may be configured to make a better choice between switching to a different content bit rate or switching to a different content server when responding to interruptions during content output, based on an awareness of a cause of the interruptions. Based on conditions associated with content delivery or information concerning playback quality at one or more user devices, an alternative bit rate ladder for encoding content may be determined. Such dynamic generation of an alternative bit rate ladder may enable fine tuning of load reductions in the content delivery network and optimized delivery of the encoded content to the user devices.

17 Claims, 5 Drawing Sheets

METHODS AND SYSTEMS FOR PROVIDING VIDEO AT MULTIPLE BIT RATES

BACKGROUND

During output of content on a user device, such as video or audio content, the output may be interrupted, such as by freezing or stalling. Such interruptions may be caused by a problem with a server or system of servers providing the content (e.g., the content delivery network), a problem with a local network to which the user device is connected, or a problem associated with a network that enables communication between the server(s) and the device, such as a service provider network. In order to avoid or minimize such interruptions, the user device may choose to switch to another server or may choose to request the content at a lower bit rate. Which choice is best often depends on what is causing the interruptions. However, because the user device is unaware of the cause of the problem, it may not make the optimal choice to resolve the problem. For example, if the device chooses to request the content at a lower bit rate when another server is available, playback quality may be reduced unnecessarily. If the device chooses to switch to another server, start time may be increased unnecessarily. If the device chooses to switch to another server when no other servers can support the best resolution, the sacrifice in playback quality (e.g., playback resolution) may be larger than is necessary. Thus improvements are needed.

SUMMARY

Methods and systems are described for enabling a user device to make a better choice in responding to interruptions during content output, based on an awareness of a cause of the interruptions. For example, based on awareness of the cause, the user device may more optimally choose between switching to a different content bit rate or switching to a different content server. The user device may determine the cause based on one or metrics associated with receiving the content.

Methods and system are also described for monitoring a condition of one or more servers of a content delivery network configured to send encoded content to user devices. Based on the condition satisfying a threshold, an alternative bit rate ladder for encoding the content may be determined. Such dynamic generation of an alternative bit rate ladder enables fine tuning of load reductions in the content delivery network and optimized delivery of the encoded content to the user devices.

Methods and systems are also provided for monitoring quality of content presented by user devices, such as groups and/or types of user devices, as user devices request different bit rate versions of the content. Based on determining that different bit rate versions of the content would better provide versions of content to accommodate the devices, an alternative bit rate ladder for encoding the content may be determined, encoded, and subsequently stored in a content delivery network. Such generation of an alternative bit rate ladder and content enables optimized delivery of content to user devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

Figure 1:
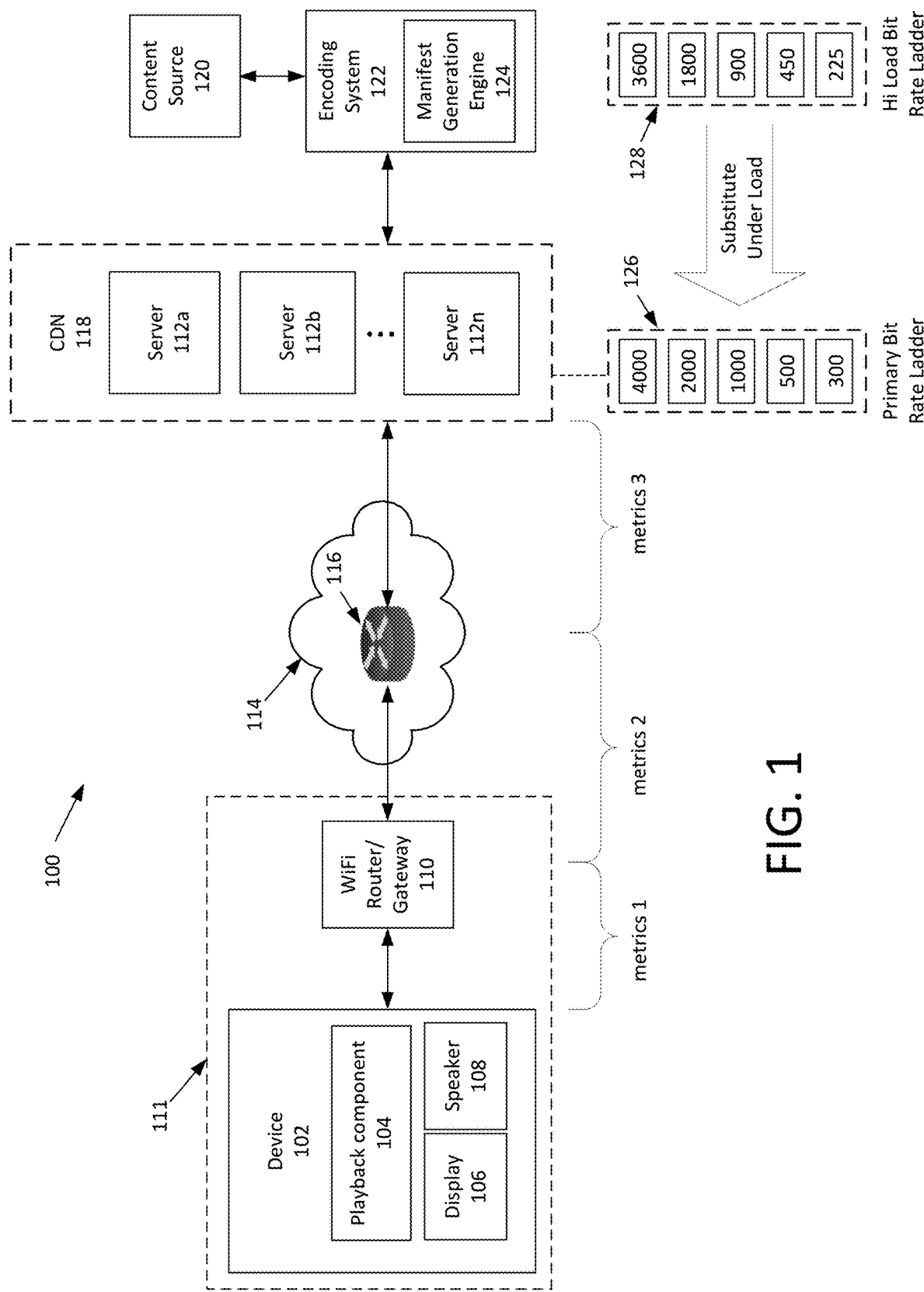
FIG. 1 shows a block diagram of an example system.

A content asset may comprise one or more of linear content, non-linear content, video content, audio content, multi-media content, a movie, a television show, a presentation, a song, an album, a live broadcast, recorded content, stored content, or any other form of content a user may wish to consume. A content asset may comprise one or more versions of the content, each of which may be referred to as a stream. Each version may comprise a different encoding of the content asset. Each version may have properties that differ from other versions, such as a different encoding bit rate, compression technique, compression ratio, resolution, frame rate, video quality (for video), number of channels, or sampling rate (for audio). Each version of a content asset may comprise one or more segments, sometimes also referred to as chunks or fragments, which may be independently accessible for playback on a user device.

Each segment may correspond to some portion of the playback time, or presentation duration, of the content. For example, each segment may have a presentation duration of two seconds of the content. Each segment may have a presentation duration of another length, such as 4, 6, or 8 seconds. Because the segments of different versions of the content may be encoded at different bit rates, segments of different streams that correspond to a same playback time/duration typically have different sizes. For example, a two second segment encoded at a higher bit rate may comprise more data (e.g., bits or bytes) than the corresponding two second segment encoded at a lower bit rate.

A version, or stream, of a content asset may be described in a manifest, and a user device may use the manifest to request segments of a version for playback on the user device. For each segment of a version of the content asset, the manifest may comprise information identifying a network location, such as a uniform resource indicator (URI) or uniform resource locator (URL), from which the segment may be retrieved. A user device may send a request to the content provider to retrieve a segment of the content, identifying the segment by its associated URI or URL. For example, the user device may send a hypertext transfer protocol (HTTP) GET request to the content provider.

Adaptive Bit Rate (ABR) streaming is a client-managed technique in which a user device monitors network conditions over time, such as available bandwidth, and switches among different bit rate versions of a content asset during playback depending on the determined network conditions. For example, if the network bandwidth available to the user device is high, the user device may request a higher bit rate version of the content for playback. However, if network conditions deteriorate, and the bandwidth available to the user device is reduced, the user device may switch to a lower bit rate version of the content in order to prevent issues during playback that would result in a poor user experience, such as freezing or stalling of the displayed content. Example implementations of adaptive bit rate streaming techniques include MPEG DASH (Dynamic Adaptive Streaming over HTTP) and Apple HLS (HTTP Live Streaming).

An encoder may be used to encode the different bit rate versions of a content asset. The different bit rate versions may be encoded and then stored, for example, as a group, for later retrieval and playback. Alternatively, or in addition, a given bit rate version of a content asset may be generated dynamically, for example upon request. Typically, the encoder offers a number of different encoding bit rates, such as, for example, three, five, or some other number of encoding bit rates. These different bit rates made available by the encoder are typically referred to as a bit rate ladder. For example, a content asset may be encoded, or offered for encoding, at the following different bit rates—4000 kbps (highest quality/resolution), 2000 kbps, 1000 kbps, 500 kbps, and 300 kbps (lowest quality/resolution)—and these different bit rates may collectively be referred to as a bit rate ladder.

In ABR streaming implementations, a user device may rely on bandwidth estimation in order to determine whether to switch to a different version of content having a lower or higher bit rate. A user device may periodically estimate the available bandwidth based on aggregated statistics associated with recently received content, such as the time required to download a recent segment of the content. If the estimated available bandwidth is sufficient to support receiving a higher bit rate version of the content, the user device may switch to the higher bit rate version from that point forward (e.g., the 4000 kbps bit rate at the top of the example bit rate ladder above). If the estimated available bandwidth is insufficient to support download of the current version of the content, the user device may choose to switch to a lower bit rate version to avoid interruptions in playback, such as stalls or freezing, that would result in a poor user experience. For example, the user device could move down the bit rate ladder in the example above from the 4000 kbps bit rate to the 2000 kbps bit rate. If problems still persist, the user device could choose to move further down the bit rate ladder, perhaps even to the lowest available bit rate (e.g., 300 kbps).

In addition, or alternatively, a user device experiencing interruptions in playback may choose to switch to requesting the desired content from a different server of the content delivery network. The server from which the user device was previously requesting the content may be experiencing problems, and switching to a different server of the content delivery network may avoid the problems with the prior server.

Unfortunately, a user devices does not always make an optimal choice when determining whether to switch to a different bit rate or switch to a different server, because the user device is unaware of the root cause of the playback interruptions it is experiencing. Because of this lack of awareness, the user device may make suboptimal choices to resolve the problem. For example, if the device chooses to request the content at a lower bit rate when another server is available, playback quality may be reduced unnecessarily. If the device chooses to switch to another server, start time may be increased unnecessarily. If the device chooses to switch to another server when no other servers can support the best resolution, the sacrifice in playback quality (e.g., playback resolution) may be larger than is necessary. Methods and systems are described herein that enable a user device to have awareness of the cause of the problem it is experiencing, so that the user device may make a better choice between switching to a different bit rate or switching to a different server.

FIG. 1 shows a block diagram of an example system 100. The system 100 may comprise a user device 102 located, for example, at a premises 111 (e.g., a home, business, etc.). The user device 102 may comprise, for example, a laptop computer, a desktop computer, a mobile phone, a television, a set-top box, a tablet, a wearable computing device, a mobile computing device, or any other computing device configured to receive and/or output (e.g., playback) content.

The user device 102 may comprise a playback component 104, a display 106, and a speaker 108. The playback component 104 may be configured to cause output of content via, for example, the display 106 and/or the speaker 108.

The playback component 104 may be configured to implement one or more ABR streaming protocols. The playback component 104 may be configured to rely on bandwidth estimation in order to determine whether to switch to a different version of content having a lower or higher bit rate. The playback component 104 may periodically estimate the available bandwidth based on aggregated statistics associated with recently received content, such as the time required to download a recent segment of the content. If the estimated available bandwidth is sufficient to support receiving a higher bit rate version of the content, the playback component 104 may choose to switch to the higher bit rate version from that point forward (e.g., the 4000 kbps bit rate at the top of the example bit rate ladder above). If the estimated available bandwidth is insufficient to support download of segments of the current version of the content, the user device may choose to switch to a lower bit rate version to avoid interruptions in output, such as stalls or freezing, that would result in a poor user experience. For example, the user device could move down the bit rate ladder from the 4000 kbps bit rate to a 2000 kbps bit rate. If problems still persist, the user device could choose to move further down the bit rate ladder.

The playback component 104 may be configured to determine a playback quality of the content. The playback component 104 may determine whether the content is being played back in an acceptable manner or whether the content is freezing, buffering, or otherwise being interrupted during playback. As discussed more fully below in connection with FIG. 2, the playback component 104 may be configured to determine, based on one or more metrics, a cause of any such impairment to content output. The playback component 104 may be configured, based on the determined cause, to choose one or more actions to attempt to avoid the interruptions in content output, such as by choosing either to switch to a version of the content encoded at a different (e.g., lower) bit rate or to switch to requesting the content from a different server of the content delivery network (e.g., switch to a different session). With such awareness of the cause of the impairment in content output, the playback component 104 may make a better choice between such operations.

The display 106 may be any device capable of displaying or outputting video or image content, such as a mobile phone, a tablet, a computer monitor, or a television screen. The display 106 may be part of the device 102 such as in the example that the device 102 is a tablet or a computer. The display 106 may be separate from the device 102 such as in an example that the device 102 is a set top box and the display 106 is a television screen in electrical communication with the set top box. The speaker 108 may be configured to output audio associated with the content.

The speaker 108 may be any device capable of outputting audio content. The speaker 108 may be part of the device 102 such as in the example that the device 102 is a streaming player, a tablet or a computer. The speaker 108 may be separate from the device 102 such as in an example that the device 102 is a set top box and the speaker 108 is a television or other external speaker in electrical communication with the set top box.

The system 100 may further comprise a router or gateway 110, which may also be located at the premises 111. The router or gateway 110 may be configured to enable user devices, such as user devices 102, to establish a wired or wireless connection to the router/gateway for purposes of communicating with the gateway and other network apparatuses beyond the gateway. The gateway 110 may be configured to establish a wired and/or wireless local area network to which the devices may connect. For purposes of communicating wirelessly, the gateway 104 may implement a wireless access technology, such as the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB"). For purposes of communicating with the gateway 104 via a wired connection, the gateway may be configured to implement a wired local area network technology, such as IEEE 802.3 ("Ethernet") or the like.

The router/gateway 110 may be configured to communicate with a service provider network 114. The router/gateway 110 may communicate with the network 114 via any of a variety of communications mediums, such as a coaxial cable network, a fiber-optic cable network, a hybrid fiber-coaxial (HFC) network, a satellite transmission channel, or the like. When part of a cable television system, the service provider network 114 may comprise a cable modem termination system (CMTS).

The service provider network 114 may provide various services to user devices, such as user device 102, and may include the appropriate infrastructure for these services. As shown, the service provider network 114 may include one or more network routers, such as network router 116. The network routers, including network router 116, may comprise one or more edge routers, which may provide connectivity to other networks, including the Internet, a telephone network, or the like.

As further shown, the service provider network 114 may provide the user device 102 with access to a content delivery network 118, which may comprise one or more content servers 112a, 112b, . . . 112n. Each content server 112a, 112b, . . . 112n, may be configured to send, to the user device and based on a request from the user device, one of a plurality of different versions of one or more content assets, for example, different versions encoded at different bit rates.

As further shown, an encoding system 122 may receive content, such as a content asset, from a content source 120. The encoding system 122 may perform encoding (e.g., transcoding) of the content. The encoding system may further include one or more packagers or the like for segmenting the content into segments in preparation for ultimately sending the content to output devices, such as user device 102.

The encoding system 122 may further comprise a manifest generation engine 124 configured to generate one or more manifests (also called "manifest files") for the content. As mentioned above, for each segment of a version of a content asset (such as a particular bit rate version), the manifest may comprise information identifying a network location, such as a uniform resource indicator (URI) or uniform resource locator (URL), from which the segment may be retrieved. A user device, such as the user device 102, may utilize the manifest associated with a particular content asset (or version of the content asset) to send a request to a server 112a, 112b, . . . 112n of the content delivery network 118 to retrieve a segment of the content, identifying the segment by its associated URI or URL. For example, the user device 102 may send a hypertext transfer protocol (HTTP) GET request to the server 112a, 112b, . . . 112n. In the MPEG DASH specification ISO 23009-1, a manifest is referred to as a media presentation description (MPD), and in the HTTP Live Streaming (HLS) specification, a manifest is referred to as a "playlist."

The manifest generation engine 124 may generate a single manifest file that contains the segment information for each different bit rate version of a content asset. Alternative, or in addition, the manifest generation engine 124 may generate a different manifest for each of the different versions of the content asset. In either case, the manifest associated with a content asset may list, specify, or otherwise indicate a bit rate ladder for the encoded content asset. For example, as illustrated in FIG. 1, the manifest for a given content asset may specify a bit rate ladder, such as the bit rate ladder 126 indicated in FIG. 1 as a primary bit rate ladder.

The example bit rate ladder 126 of FIG. 1 indicates that versions of an associated content asset are available at five different bit rates—4000 kbps (highest quality/resolution), 2000 kbps, 1000 kbps, 500 kbps, and 300 kbps (lowest quality/resolution). Other bit rate ladders may specify more or less bit rates, and the bit rates specified in other bit rate ladders may be different. The bit rate ladder 126 is just one example.

As further illustrated in FIG. 1, and as described hereinafter in greater detail in connection with FIG. 3, the encoding system 122 may determine, based on information provided by the content delivery network 118, that a condition e.g. load or performance) of one or more of the servers 112a, 112b, . . . 112n of the content delivery network 118 has reached a threshold. In order to help prevent problems with content delivery to user devices as a result of the condition of the content delivery network, the encoding system 122 may substitute the primary bit rate ladder 126 with a different bit rate ladder, such as the bit rate ladder 128 illustrated in FIG. 1 and referred to herein as a secondary bit rate ladder or high load bit rate ladder. That is, based on determining that a condition of one or more servers of the content delivery network has reached (e.g., met or exceeded) a threshold, the encoding system 122 may determine, generate, or otherwise create a secondary bit rate ladder, such as the high load bit rate ladder 128 illustrated in FIG. 1. The secondary bit rate ladder may be substituted in place of the primary bit rate ladder.

The secondary bit rate ladder may have a lower top bit rate and/or a lower ratio between rungs than the primary bit rate ladder. For example, the top bit rate of the primary bit rate ladder may be 4 Mbps, and there may be a ratio of between 1.5-2 between rungs of the primary bit rate ladder. However, in the event certain load or performance thresholds are passed, the encoding system 112 may switch to a more constrained bit rate ladder where the top bit rate is reduced by some amount or percentage, such as 10% for example. Thus, the top bit rate of the secondary bit rate ladder (high load bit rate ladder) in the example of FIG. 1 may be 3.6 Mbps. The ratio between rungs of the secondary bit rate ladder may be reduced, for example, from a ratio of 1.5-2 to a ratio of 1.5-1.75.

Figure 2:
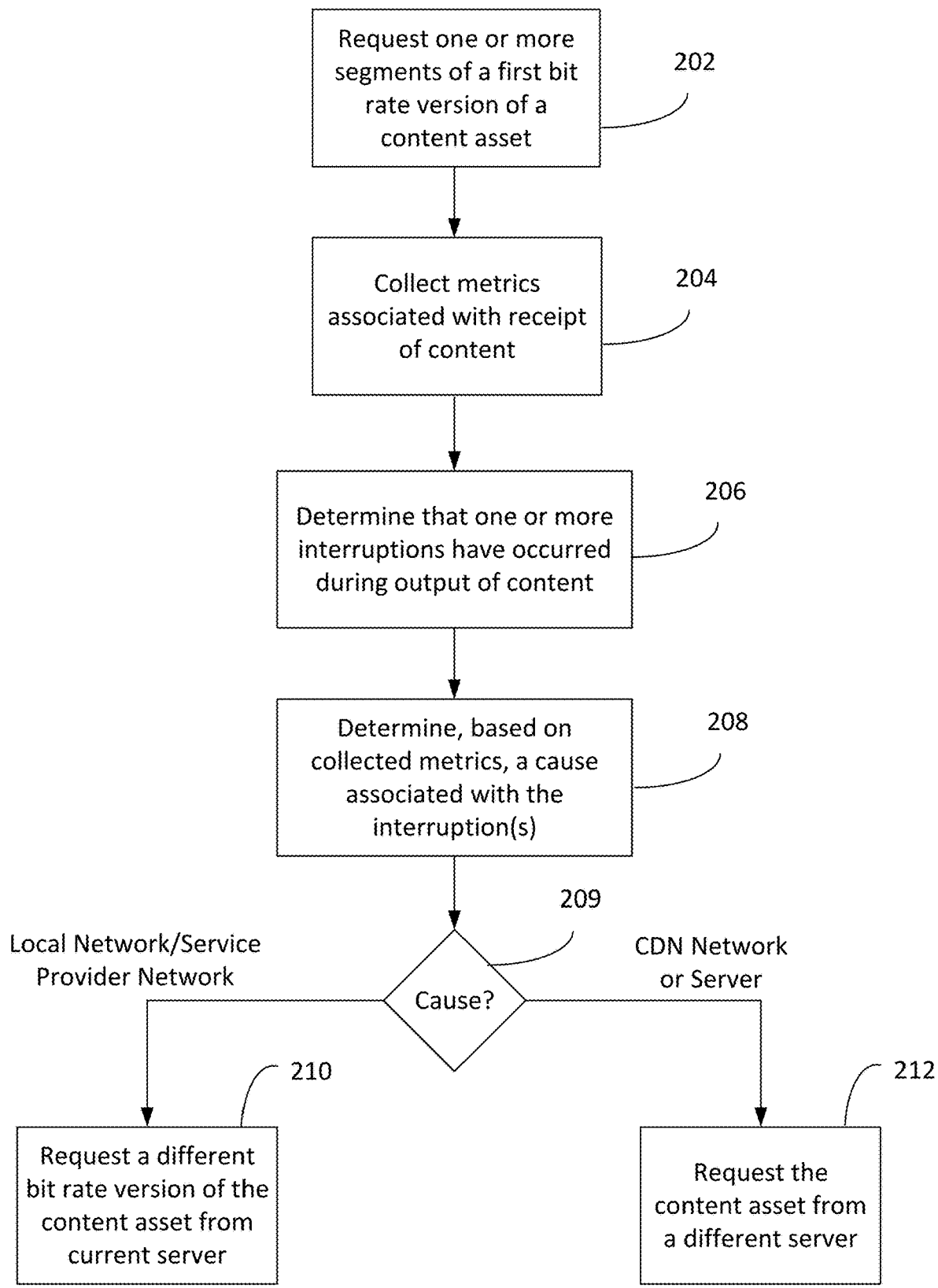
FIG. 2 shows an example method.

FIG. 2 shows a flow chart of an example method 200. The method 200 may be performed, for example, by the playback component 104 of the user device 102 of FIG. 1. The method may be performed by another component (not shown) of the user device 102.

At step 220, the playback component 104 may request one or more segments of a first bit rate version of a content asset for output (e.g., playback) on the user device 102. The request for each segment may be sent to one of the servers 112a . . . n of the content delivery network 118. The request(s) may be based on a manifest associated with the content asset or the particular bit rate version of the content asset. The manifest may comprise information identifying a network location, such as a uniform resource indicator (URI) or uniform resource locator (URL), from which each requested segment may be retrieved. The request for a given segment of the content asset may identify the segment by its URI or URL. The request may comprise a hypertext transfer protocol (HTTP) GET request, for example.

The manifest associated with the content asset may identify a bit rate ladder associated with the content asset, such as the bit rate ladder 126 of FIG. 1. The first bit rate version of the content asset requested by the playback component 104 may be the highest bit rate version of the ladder. For example, using the example bit rate ladder 126 of FIG. 1, the playback component 104 may initially request segments of the version of the content asset encoded at a bit rate of 4000 kbps. The playback component 104 may choose a different initial (i.e., first) bit rate.

At step 204, as segments of the selected bit rate version of the content asset are requested and received for output on the user device 102, such as via display 106, the user device 102 may be configured to collect metrics associated with receipt and/or presentation of the content. With reference to FIG. 1, the playback component 104 or another component of the user device 102 may be able to obtain a variety of metrics (e.g., metrics 1, metrics 2, metrics 3) associated with delivery of content and/or other data to the user device 102 from various components and/or network segments of the system 100.

For example, the user device 102 may be configured to obtain one or more first metrics (metrics 1 in FIG. 1) associated with the local connection (e.g., Wi-Fi) between the user device and the gateway 110. The first metrics (metrics 1) may be determined by the user device 102. The first metrics may be determined by the gateway 110, which may provide the metrics to the user device 102 and/or the playback component 104. The first metrics may comprise a measure of latency associated with transmission and receipt of data (e.g., packets) between the user device 102 and the gateway 110. The first metrics may comprise one or more other metrics associated with the connection between the user device 102 and the gateway, such as radio signal strength, physical layer data rate (i.e., Phy rate), packet loss, and/or throughput, among others. The playback component 104 may be configured to determine whether one or more of the first metrics satisfies (e.g., meets or exceeds) a threshold or threshold value. For example, the playback component may be configured to determine whether a measure of latency (e.g., Wi-Fi latency) has exceeded a threshold value (e.g., Wi-Fi latency>X). The playback component 104 may be configured to employ an algorithm that evaluates one or a combination of the first metrics to determine if the local connection between the user device 102 and the gateway 110 is operating within expected tolerances.

The user device 102 may be configured to obtain one or more second metrics (metrics 2 in FIG. 1) associated with the communication path between the gateway 110 and the service provider network 114 and/or one or more routers 116 of the service provider network. The second metrics may be determined by the gateway 110. The second metrics may be determined by the service provider network and/or a router (e.g., router 116) of the service provider network. The second metrics may be sent to the user device 102 and/or playback component 104 by the gateway 110 and/or the service provider network 114 (e.g., by the router 116). The second metrics may comprise a measure of packet error rate associated with packets transmitted between the gateway 110 and the service provider network 114. The second metrics may comprise other metrics associated with the connection between the gateway 110 and the service provider network 114, such as throughput or available bandwidth. The playback component 104 may be configured to determine whether a given second metric satisfies (e.g., meets or exceeds) a threshold or is outside of expected tolerances. For example, the playback component may be configured to determine whether a measure of packet error rate has exceeded a threshold value (e.g., Packet Error Rate>Y).

The user device 102 may be configured to received or otherwise obtain one or more third metrics (metrics 3 in FIG. 1) associated with the content delivery network 118 and/or the communication path between the service provider network 114 (e.g., router 116) and one or more of the servers 112a . . . n of the content delivery network 118. The third metrics may be determined by the service provider network 114 or a component thereof, such as the router 116. The third metrics may be determined by the content delivery network 118 and/or by one of the servers 112a . . . n of the content delivery network. The third metrics may be sent to the user device 102 by the service provider network 114 or a component of the content delivery network 118. The third metrics may comprise a measure of load on one or more of the servers 112a . . . n of the content delivery network. The third metrics may comprise a measure of performance associated with the content delivery network 118 and/or one of the servers 112a . . . n. The third metrics may comprise other metrics associated with the content delivery network 118.

At step 206, the playback component 104 and/or user device 102 may determine that output (i.e., playback) of the segments of the content has or will become impaired. For example, the playback component 104 may determine that one or more interruptions in content output have occurred. The one or more interruptions may comprise a stall, a freeze, or any other impairment in content output. For example, a buffer of the user device used to store incoming segments until they can be output for display may become empty, because the user device 102 has not been able to receive requested segments of the current bit rate version of the content asset at a rate needed to maintain an adequate level of segments in the buffer so that they are available at presentation time. The playback component 104 may determine that output has become impaired based on determining that the buffer is empty at a next segment presentation time. The playback component 104 may determine that output of the content has become impaired based on a determination that a current bandwidth available to the user device 102 and/or playback component is insufficient to sustain playback of the current selected bit rate version of the content. The playback component 104 may determine (e.g., estimate) the current bandwidth available based on a measure of throughput associated with received segments of the content asset. For example, the playback component may be configured to determine a current available bandwidth by dividing a size of a recently received segment by a measure of the time needed to receive the segment. The playback component may determine that output of the content is impaired if the determined available bandwidth is less than the encoded bit rate of the currently selected bit rate version of the content asset being requested.

In step 208, as a result of, in response to, or based on the detected interruption(s) in content output, the playback component 104 may determine, based on the one or more metrics collected in step 204, a possible cause associated with the interruptions. For example, if one or more of the first metrics has exceeded a threshold value, the playback component 104 may determine that the cause of the interruptions is due a problem with the communication path between the user device 102 and the gateway 110. For example, if a measure of Wi-Fi latency associated with Wi-Fi communications between the user device 102 and the gateway 110 has exceeded a threshold value (e.g., Wi-Fi latency>X), the playback component 104 may determine that a problem exists with the Wi-Fi network or Wi-Fi connectivity with the gateway 110.

If one or more of the second metrics has exceeded a threshold value, the playback component 104 may determine that the cause of the interruptions is due a problem with the service provider network 114 or the communication path between the gateway 110 and the service provider network 114 or one or more of the routers 116 of the service provider network 114. For example, if a measure of packet error rate associated with communications between the gateway 110 and the service provider network 114 has exceeded a threshold value (e.g., Packet Error Rate>Y), the playback component 104 may determine that a problem exists with the service provider network 114 or the communication path between the gateway 110 and the service provider network 114.

If one or more of the third metrics has exceeded a threshold value, the playback component 104 may determine that the cause of the interruptions is due a problem with the content delivery network 118. For example, if a measure of load on one or more of the servers 112a . . . n of the content delivery network 118, such as the server 112a . . . n from which the playback component 114 is currently requesting content segments, has exceeded a threshold value, the playback component 104 may determine that a problem exists with the content delivery network 118 and/or that server. The playback component 114 may also determine that a problem exists with the content delivery network 118 and/or the server 112a . . . n from which it is currently requesting content segments based on an analysis of the first and second metrics. For example, if the playback component 104 determines that neither of the first or second metrics has exceeded their respective thresholds (and thus there is not a problem with communications between the user device 102 and gateway 110 nor between the gateway 110 and service provider network 114), the playback component 104 may conclude that a problem exists with the content delivery network 118 and/or the server 112a . . . n from which it is currently requesting content segments (e.g., if Wi-Fi latency<X, and Packet Error Rate<Y, the cause of the problem likely is with the CDN 118 or current server 112a . . . n).

As illustrated in FIG. 2 at 209, based on determining the cause of the interruption(s) in the content output, the playback component 104 may choose to perform one or more actions in an attempt to resolve the problems (e.g., interruptions) with content output. For example, the playback component may choose either to request a different version of the content asset encoded at a different bit rate (e.g., choose to move up or down the bit rate ladder 126) or to request the segments of the content asset from a different server 112a . . . n of the content delivery network 118 (e.g., switch sessions to a different server but maintain the current bit rate). For example, if the playback component 104 determines the cause of interruptions associated with content output are the result of problems associated with its local connection to the gateway 110 or problems with the service provider network 114 or the communications path between the gateway 110 and the service provider network 114, the playback component may choose to begin requesting segments of a different bit rate version of the content asset as step 210. For example, the playback component 104 may choose to move down the bit rate ladder 126 to a version of the content asset encoded at a lower bit rate.

If the playback component 104 determines the cause of the interruptions is associated with the content delivery network 118 and/or the server 112a . . . n from which the playback component is currently requesting content segments, the playback component 104 may choose to switch (e.g., change sessions) to a different server 112a . . . n of the content delivery network 104 at step 212. In this example, the playback component may choose to stay with the same bit rate version of the content asset (i.e., stay on the same rung of the bit rate ladder). In another example, the playback component 104 may choose also to switch to a different bit rate.

As can be appreciated, by providing the playback component 104 with awareness of the cause of interruptions in content output, the playback component 104 may make a better choice when attempting to resolve the problem, such as a better choice between switching to a different bit rate or switching to a different server.

Figure 3:
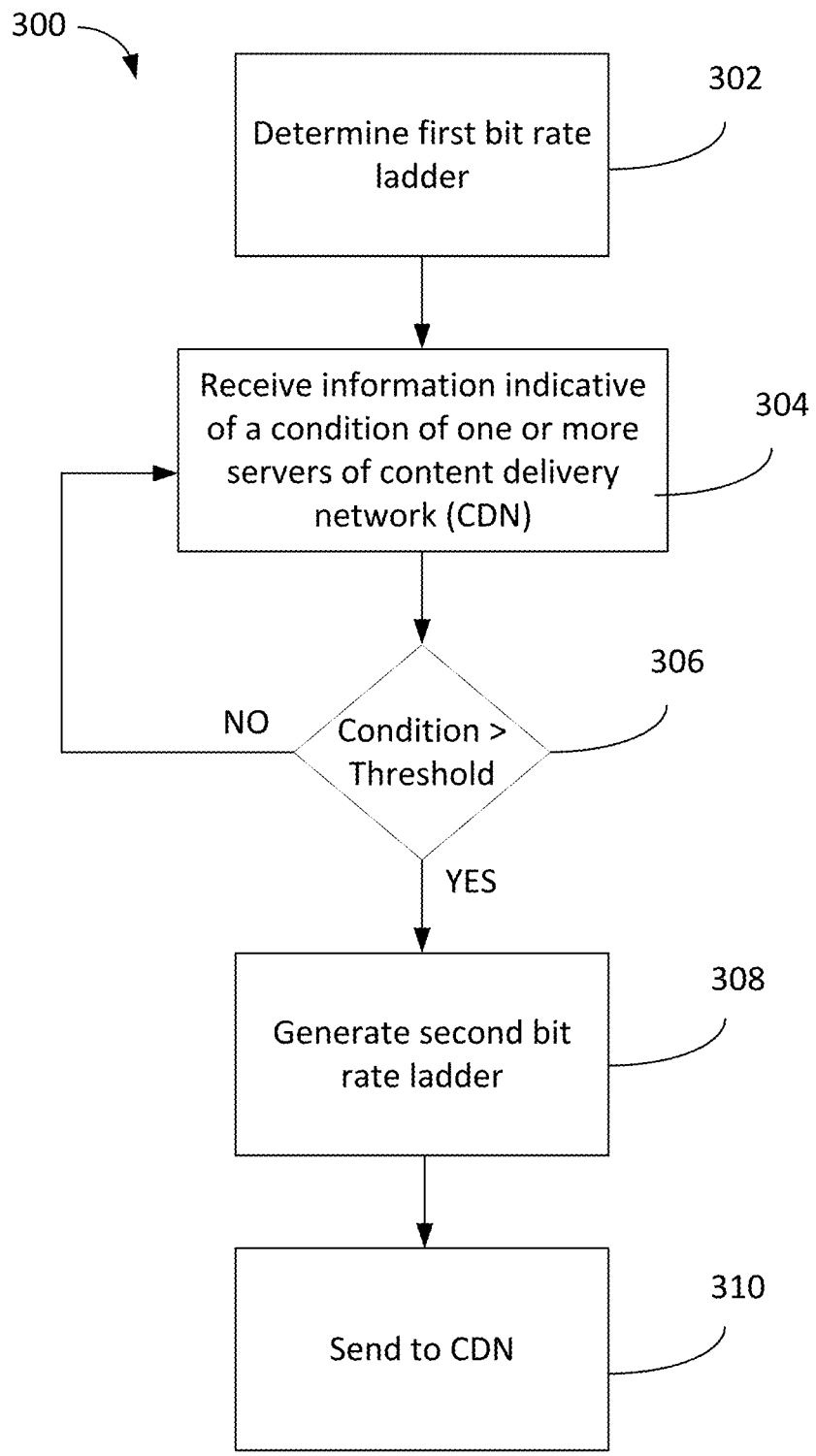
FIG. 3 shows an example method.

FIG. 3 illustrates another method. The method of FIG. 3 may be performed as an alternative to, or in addition to, the method of FIG. 2. The method of FIG. 3 may be performed, for example, by the encoding system 122. The method of FIG. 3 may be performed by the manifest generation engine 124 of the encoding system 122. The method of FIG. 3 may be performed by another component (not shown) of the encoding system 122 or another component of the system 100.

In step 302, a first, or primary, bit rate ladder may be determined. The first bit rate ladder may be determined by the encoding system 122, such as by the manifest generation engine 124. The first bit rate ladder may be incorporated into manifests associated with content assets encoded, in accordance with the bit rate ladder, by the encoding system 122. The manifest(s) and/or first bit rate ladder may be sent to the content delivery network 118, which may send the manifest(s) and/or information concerning the first bit rate ladder to one or more user devices, such as user device 102. As an example, the first (e.g., primary) bit rate ladder may comprise the example bit rate ladder 126 illustrated in FIG. 1.

In step 304, information indicative of a condition associated with the content delivery network 118 and/or one or more servers 112a . . . n of the content delivery network may be received. The information may be associated with a segment (e.g., a subset of the servers 112a . . . n) of the content delivery network. The information may be received by the encoding system 122. The information may be received by the manifest generation engine 124 of the encoding system 122.

The information may be sent to the encoding system 122 by the content delivery network 118 and/or one or more servers 112a . . . n of the content delivery network. The content delivery network 118 may send the information on its own initiative, for example, upon detecting the condition. The encoding system 112 may poll the content delivery network 118, for example, using an application programming interface of the content delivery network, and the content delivery network may send the information in response to such polling. For example, the encoding system 122 may poll the content delivery network every 30 seconds, or at some other time interval.

The information may comprise one or more metrics associated with a condition of the content delivery network 118 and/or one or more of the servers 112a . . . n of the content delivery network. The metrics may comprise real-time metrics. The information may comprise information indicative of one or more of a load, a throughput, a latency, or another metric associated with one or more servers 112a . . . n of the content delivery network 118.

In step 306, the encoding system 112 may determine whether the received information indicates a condition that satisfies (e.g., meets or exceeds) a threshold or otherwise is outside of expected tolerances. For example, the encoding system 112 may determine that a load associated with one or more of the servers 112a . . . n of the content delivery network has exceeded a threshold value. If the encoding system determines from the received information that the content delivery network is operating within expected tolerances, control may pass back to step 304 in which the encoding system 112 may await the receipt of additional information.

If in step 306, it is determined that the received information indicates a condition of the content delivery network 118 that satisfies (e.g., meets or exceeds) a threshold value or that is outside of expected tolerances, then in step 308, the encoding system 122 and/or the manifest generation engine 124 may determine (e.g., generate) a second bit rate ladder. The second bit rate ladder may also be referred to as a secondary bit rate ladder or, in an example, as a high load bit rate ladder. The second bit rate ladder may be configured to help bring the determined condition below its threshold or otherwise help the content delivery network 118 to operate within expected tolerances. For example, the second bit rate ladder may be configured to help reduce a load on one or more servers 112a-112n of the content delivery network 118.

As an example, the second bit rate ladder generated or determined in step 308 may comprise the example bit rate ladder 128 illustrated in FIG. 1. The secondary bit rate ladder may have a lower top bit rate and/or a lower ratio between rungs than the primary bit rate ladder. For example, the top bit rate of the primary bit rate ladder may be 4000 kbps, and there may be a ratio of between 1.5-2 between rungs of the primary bit rate ladder. The second bit rate ladder may be a more constrained bit rate ladder where the top bit rate is reduced by some amount or percentage, such as 10% for example. For example, the top bit rate of the second bit rate ladder (high load bit rate ladder) 128 in the example of FIG. 1 may be 3600 kbps. The ratio between rungs of the second bit rate ladder 128 may be reduced, for example, from a ratio of 1.5-2 to a ratio of 1.5-1.75. In other examples, the percentage difference between the highest rungs of the primary and secondary bit rate ladders may be more or less than 10%. In other examples, the secondary bit rate ladder may have a higher top bit rate and/or a higher ratio between rungs than the primary bit rate ladder.

An encoding system, such as the encoding system 122, may encode and/or perform transcoding of a content asset in accordance with the second bit rate ladder. For example, the encoding system 122 may encode and/or create a different version of the content asset for each of the bit rates of the second bit rate ladder. Each of the different bit rate versions may comprise a plurality of content segments encoded at the bit rate associated with that version of the content asset. The content segments of each bit rate version may be encoded and then stored, for example, on one or more servers 112a, 112b, . . . 112n of the content delivery network 118, for later retrieval and playback. Alternatively, or in addition, the content segments of a given bit rate version of the content asset may be generated dynamically, for example, upon request. An updated manifest may be generated for the content asset that comprises information concerning the second bit rate ladder and information concerning the storage locations (e.g., URLs) of the encoded content segments of one or more of the bit rate versions of the content asset stored in the content delivery network 118.

Step 308 may be repeated. For example, if substitution of the secondary bit rate ladder does not ameliorate the condition determined in step 306, the encoding system 122 may generate a third bit rate ladder that may comprise a further incremental reduction in the top bit rate of the third bit rate ladder and/or a further reduction in the ratio between rungs. Step 308 may be repeated multiple times, such that fourth, fifth, or more other bit rate ladders are generated, as needed, to bring the condition below its threshold.

In step 310, the encoding system 122 and/or the manifest generation engine 124 may send the second bit rate ladder, or information indicative of the second bit rate ladder, to the content delivery network 118 and/or to one or more servers 112a . . . n of the content delivery network. The second bit rate ladder, or information indicative of the second bit rate ladder, may be sent on its own. Alternatively, or in addition, the second bit rate ladder, or information indicative of the second bit rate ladder, may be sent to the content delivery network 118 as part of one or more updated manifests associated with one or more content assets that the content delivery network 118 makes available to one or more user devices. The encoding system 122 may send, to the content delivery network 118, content segments encoded at one or more of the different bit rates of the second bit rate ladder. The content delivery network 118 may store the content segments encoded at each of the different bit rates of the second bit rate ladder, in order to make them available for retrieval and playback by or on a user device.

The content delivery network 118, or one or more servers 112a . . . n of the content delivery network, may cause a playback component of a user device, such as the playback component 104 of the user device 102 of FIG. 1, to obtain a new manifest, containing information indicative of the second bit rate ladder, for a content asset currently being accessed by the playback component. For example, the content delivery network 118 may signal the playback component that the new manifest containing the second bit rate ladder is available, which may cause the playback component to request the new manifest from the server 112a . . . n it is currently accessing. As another example, the content delivery network 118 may push the new manifest to the playback component. As yet another example, the server the playback component is currently communicating with may stop responding, which may cause the playback component to switch to another server of the content delivery network; the new server may then send the new manifest to the playback component 104 as part of the switch to that server. As a further example, the current server may send an HTTP 503 code (or another 5xx code) to the playback component to cause it to obtain the new manifest.

As can be appreciated, dynamic generation of an alternative bit rate ladder in the manner illustrated in FIG. 3 enables fine tuning of load reductions in the content delivery network and optimized delivery of the encoded content to the user devices.

Figure 4:
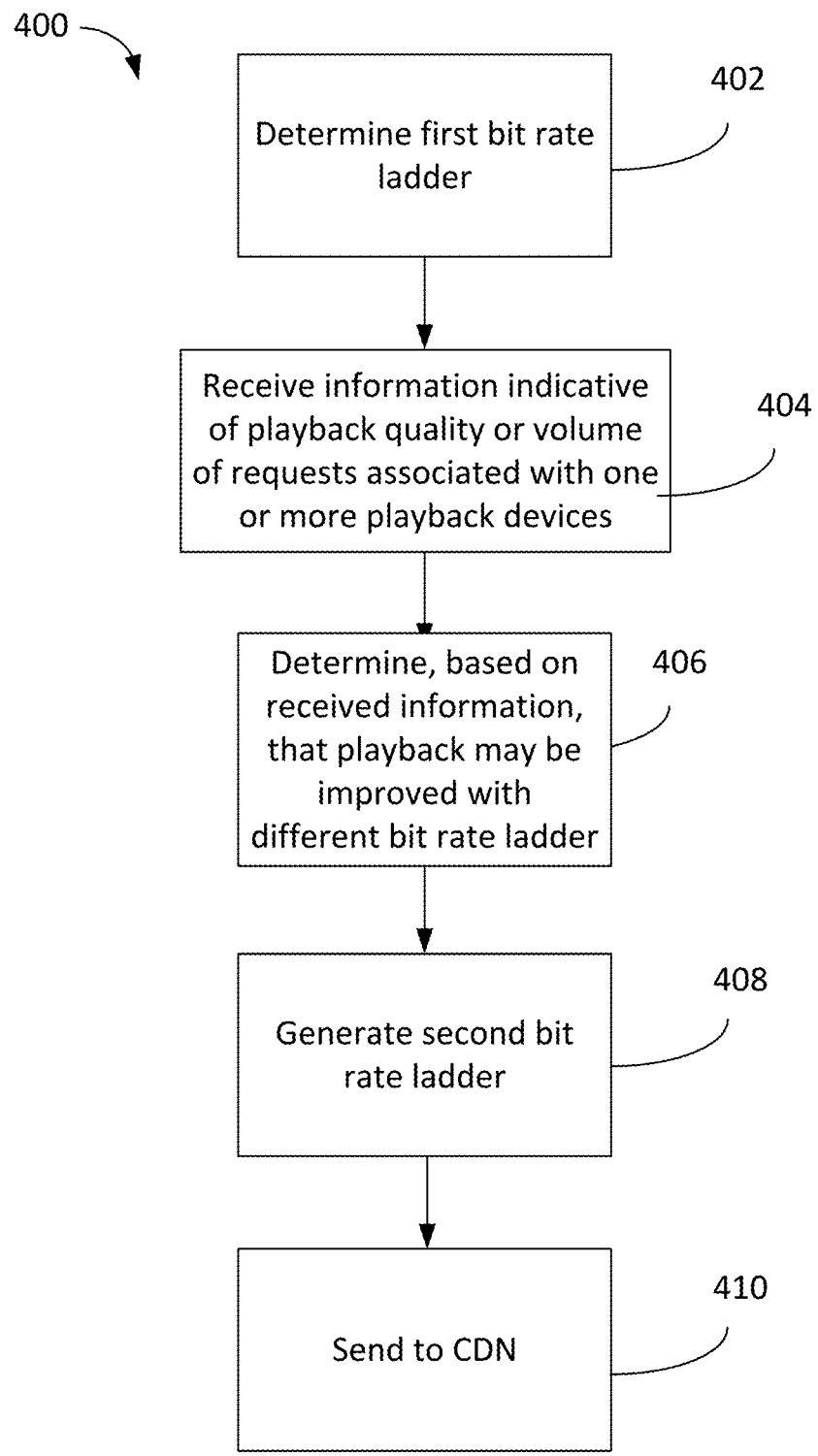
FIG. 4 shows an example method.

FIG. 4 illustrates another method. The method of FIG. 4 may be performed as an alternative to, or in addition to, the methods of FIGS. 2 and 3. The method of FIG. 4 may be performed, for example, by the encoding system 122. The method of FIG. 4 may be performed by the manifest generation engine 124 of the encoding system 122. The method of FIG. 4 may be performed by another component (not shown) of the encoding system 122 or another component of the system 100.

In step 402, a first, or primary, bit rate ladder may be determined. The first bit rate ladder may be determined by the encoding system 122, such as by the manifest generation engine 124. The first bit rate ladder may be incorporated into manifests associated with content assets encoded, in accordance with the bit rate ladder, by the encoding system 122. The manifest(s) and/or first bit rate ladder may be sent to the content delivery network 118, which may send the manifest (s) and/or information concerning the first bit rate ladder to one or more user devices, such as user device 102. As an example, the first (e.g., primary) bit rate ladder may comprise the example bit rate ladder 126 illustrated in FIG. 1.

In step 404, information indicative of playback quality or volume of requests associated with one or more user devices may be received. The information may comprise one or more of the first, second, or third metrics discussed above in connection with step 204 of FIG. 2. The information may comprise other metrics or information indicative of playback quality at the one or more user devices. The information may be received by the encoding system 122. The information may be received by the manifest generation engine 124 of the encoding system 122.

The information may be sent to the encoding system 122 by the content delivery network 118 and/or one or more servers 112a . . . n of the content delivery network. The content delivery network 118 may send the information on its own initiative, for example, upon detecting or receiving information associated with the metrics. The encoding system 112 may poll the content delivery network 118, for example, using an application programming interface of the content delivery network, and the content delivery network may send the information in response to such polling. For example, the encoding system 122 may poll the content delivery network every 30 seconds, or at some other time interval.

In step 406, the encoding system 112 may determine whether the received information indicates a condition that may be improved with a different bit rate ladder for one or more content assets. For example, the encoding system 112 may determine that playback quality of the one or more user devices may be improved if a bit rate ladder, different from the first bit rate ladder, is employed in the encoding of one or more content assets.

If in step 406, it is determined that the received information indicates a condition that may be improved with a different bit rate ladder, in step 408, the encoding system 122, manifest generation engine 124, or another component of the system 100 may determine (e.g., generate) a second bit rate ladder. The second bit rate ladder may also be referred to as a secondary bit rate ladder. The second bit rate ladder may be configured to improve playback quality at the one or more user devices.

The secondary bit rate ladder may have a higher top bit rate and/or a higher ratio between rungs than the primary bit rate ladder. The secondary bit rate ladder may have a lower top bit rate and/or a lower ratio between rungs than the primary bit rate ladder. As an example, the second bit rate ladder generated or determined in step 408 may comprise the example bit rate ladder 128 illustrated in FIG. 1. For example, the top bit rate of the primary bit rate ladder may be 4000 kbps, and there may be a ratio of between 1.5-2 between rungs of the primary bit rate ladder. The second bit rate ladder may be a more constrained bit rate ladder where the top bit rate is reduced by some amount or percentage, such as 10% for example. For example, the top bit rate of the second bit rate ladder (high load bit rate ladder) 128 in the example of FIG. 1 may be 3600 kbps. The ratio between rungs of the second bit rate ladder 128 may be reduced, for example, from a ratio of 1.5-2 to a ratio of 1.5-1.75. In other examples, the percentage difference between the highest rungs of the primary and secondary bit rate ladders may be more or less than 10%.

An encoding system, such as the encoding system 122, may encode and/or perform transcoding of a content asset in accordance with the second bit rate ladder. For example, the encoding system 122 may encode and/or create a different version of the content asset for each of the bit rates of the second bit rate ladder. Each of the different bit rate versions may comprise a plurality of content segments encoded at the bit rate associated with that version of the content asset. The content segments of each bit rate version may be encoded and then stored, for example, on one or more servers 112a, 112b, . . . 112n of the content delivery network 118, for later retrieval and playback. Alternatively, or in addition, the content segments of a given bit rate version of the content asset may be generated dynamically, for example, upon request. An updated manifest may be generated for the content asset that comprises information concerning the second bit rate ladder and information concerning the storage locations (e.g., URLs) of the encoded content segments of one or more of the bit rate versions of the content asset stored in the content delivery network 118.

Step 408 may be repeated. For example, if substitution of the secondary bit rate ladder does not sufficiently improve playback quality at the one or more user devices, the encoding system 122 may generate a third bit rate ladder that may comprise a further incremental increase or reduction in the top bit rate of the third bit rate ladder and/or a further increase or reduction in the ratio between rungs. Step 408 may be repeated multiple times, such that fourth, fifth, or more other bit rate ladders are generated, as needed, to improve playback quality.

In step 410, the encoding system 122 and/or the manifest generation engine 124 may send the second bit rate ladder, or information indicative of the second bit rate ladder, to the content delivery network 118 and/or to one or more servers 112a . . . n of the content delivery network. The second bit rate ladder, or information indicative of the second bit rate ladder, may be sent on its own. Alternatively, or in addition, the second bit rate ladder, or information indicative of the second bit rate ladder, may be sent to the content delivery network 118 as part of one or more updated manifests associated with one or more content assets that the content delivery network 118 makes available to one or more user devices. The encoding system 122 may send, to the content delivery network 118, content segments encoded at one or more of the different bit rates of the second bit rate ladder. The content delivery network 118 may store the content segments encoded at each of the different bit rates of the second bit rate ladder, in order to make them available for retrieval and playback by or on a user device.

The content delivery network 118, or one or more servers 112a . . . n of the content delivery network, may cause a playback component of a user device, such as the playback component 104 of the user device 102 of FIG. 1, to obtain a new manifest, containing information indicative of the second bit rate ladder, for a content asset currently being accessed by the playback component. For example, the content delivery network 118 may signal the playback component that the new manifest containing the second bit rate ladder is available, which may cause the playback component to request the new manifest from the server 112a . . . n it is currently accessing. As another example, the content delivery network 118 may push the new manifest to the playback component. As yet another example, the server the playback component is currently communicating with may stop responding, which may cause the playback component to switch to another server of the content delivery network; the new server may then send the new manifest to the playback component 104 as part of the switch to that server. As a further example, the current server may send an HTTP 503 code (or another 5xx code) to the playback component to cause it to obtain the new manifest.

As can be appreciated, dynamic generation of an alternative bit rate ladder in the manner illustrated in FIG. 4 may improve playback quality at the one or more user devices.

Figure 5:
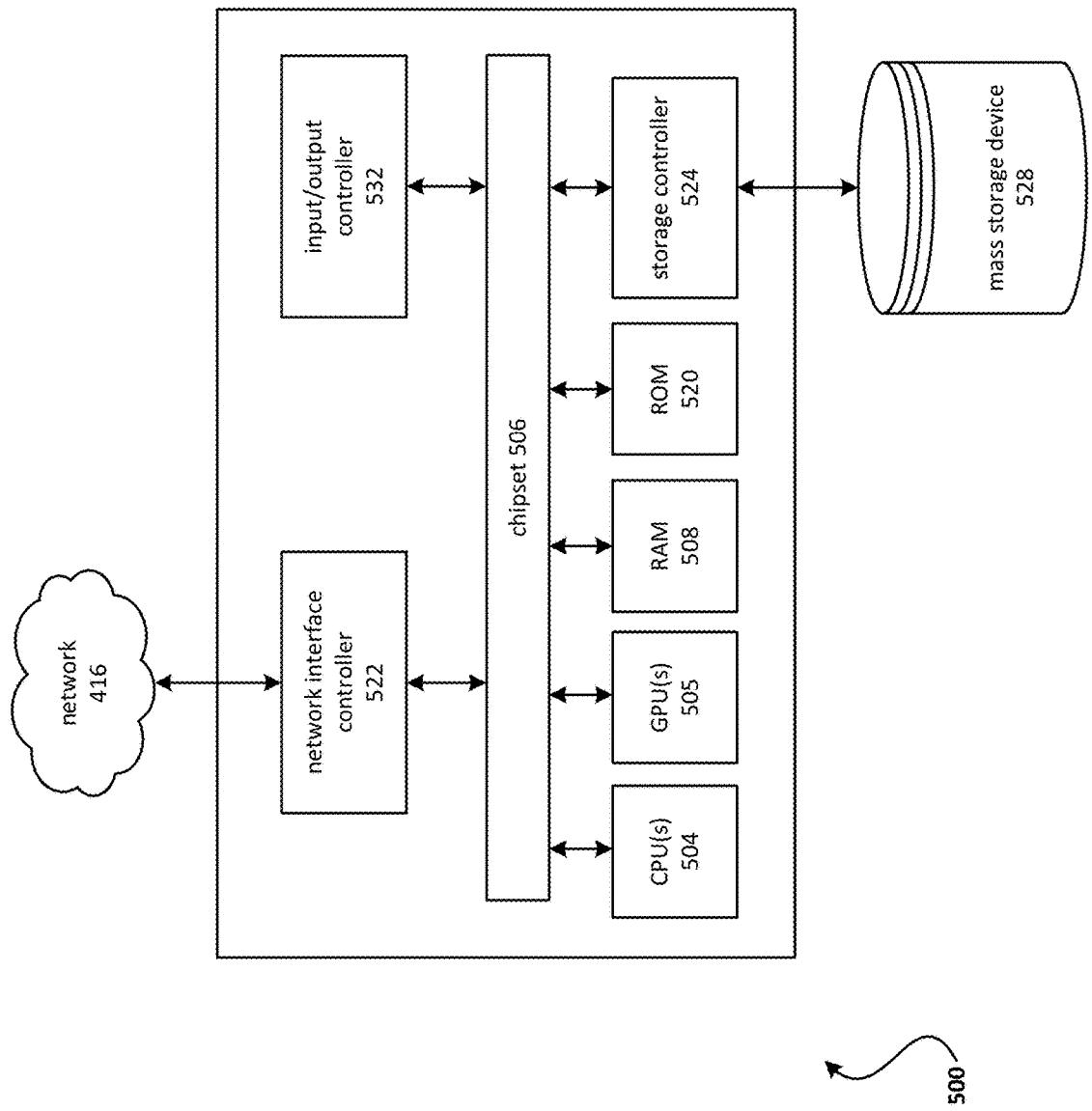
FIG. 5 shows a block diagram of an example computing device.

FIG. 5 depicts a computing device that may be used in various aspects, such as the servers, modules, and/or devices depicted in FIG. 1. The computer architecture shown in FIG. 5 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to a random access memory (RAM) 508 used as the main memory in the computing device 500. The chipset 506 may provide an interface to a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a mass storage device 528 that provides non-volatile storage for the computer. The mass storage device 528 may store system programs, application programs, other program modules, and data, which have been described in greater detail herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the mass storage device 528 by detecting the physical states or characteristics of one or more particular locations within the physical storage units.

In addition to the mass storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described herein. The computing device 500 may have access to computer-readable storage media storing computer-executable instructions, which, when executed by the computing device 500, may perform the methods described in relation to FIGS. 2-5.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes—from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific example or combination of examples of the described methods.

As will be appreciated by one skilled in the art, the methods and systems may take the form of an entirely hardware implementation, an entirely software implementation, or an implementation combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described examples. The example systems and components described herein may be configured differently than described. For example, elements may be added to, removed from, or rearranged compared to the described examples.

It will also be appreciated that various items are illustrated as being stored in memory or on storage while being used, and that these items or portions thereof may be transferred between memory and other storage devices for purposes of memory management and data integrity. Alternatively, in other examples, some or all of the software modules and/or systems may execute in memory on another device and communicate with the illustrated computing systems via inter-computer communication. Furthermore, in some examples, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

While the methods and systems have been described in connection with specific examples, it is not intended that the scope be limited to the particular examples set forth, as the examples herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of examples described in the specification.

It will be apparent to those skilled in the art that various modifications and variations may be made without departing from the scope or spirit of the present disclosure. Other variations will be apparent to those skilled in the art from consideration of the specification and practices described herein. It is intended that the specification and example figures be considered as exemplary only, with a true scope and spirit being indicated by the following claims.

What is claimed:

1. A method comprising:
    generating a first bit rate ladder comprising a first plurality of bit rates, wherein the first bit rate ladder has a first ratio between consecutive bit rates of the first plurality of bit rates;
    encoding content at each of the first plurality of bit rates of the first bit rate ladder;
    receiving information indicative of a condition associated with one or more servers configured to transmit the content encoded at one or more of the first plurality of bit rates of the first bit rate ladder; and
    based on determining that the condition satisfies a threshold, generating a second bit rate ladder comprising a second plurality of bit rates, wherein the second bit rate ladder has a second ratio between consecutive bit rates of the second plurality of bit rates that is changed from the first ratio to cause the condition to no longer satisfy the threshold;
    encoding the content at each of the second plurality of bit rates of the second bit rate ladder; and
    monitoring the condition associated with the one or more servers configured to transmit the content to determine whether, based on the second bit rate ladder, the condition no longer satisfies the threshold.

2. The method recited in claim 1, wherein the first plurality of bit rates form a first bit rate ladder, and wherein the second plurality of bit rates form a second bit rate ladder.

3. The method recited in claim 1, wherein the condition comprises one of a measure of load associated with the one or more servers or a measure of performance associated with the one or more servers.

4. The method recited in claim 1, further comprising:
generating a first manifest associated with the content, wherein the first manifest comprises information indicative of the first plurality of bit rates; and
based on the determining that the condition satisfies the threshold, generating a second manifest associated with the encoded content, wherein the second manifest comprises information indicative of the second plurality of bit rates.

5. The method recited in claim 4, further comprising:
sending, to the one or more servers, for transmission by the one or more servers to a user device, the first manifest; and
based on the determining that the condition satisfies the threshold, sending, to the one or more servers, the second manifest to be used as a replacement for the first manifest.

6. The method recited in claim 1, wherein determining that the condition satisfies the threshold comprises determining that the condition exceeds the threshold.

7. The method of claim 1, wherein a number of rungs in the first plurality of bit rates is different than a number of rungs in the second plurality of bit rates.

8. The method of claim 1, further comprising:
sending, to a content delivery network, a polling request, wherein the information is received based on sending the polling request.

9. A method comprising:
generating a first bit rate ladder comprising a first plurality of bit rates, wherein the first bit rate ladder has a first ratio between consecutive bit rates of the first plurality of bit rates;
encoding content at each of the first plurality of bit rates of the first bit rate ladder;
receiving information indicative of playback quality of the content at one or more user devices; and
based on the information indicative of playback quality, generating a second bit rate ladder comprising a second plurality of bit rates, wherein the second bit rate ladder has a second ratio between consecutive bit rates of the second plurality of bit rates that is changed from the first ratio to cause the playback quality to become acceptable;
encoding the content at each of the second plurality of bit rates of the second bit rate ladder; and
monitoring the playback quality of the content to determine whether, based on the second bit rate ladder, the playback quality is acceptable.

10. The method recited in claim 9, wherein a ratio of change from one bit rate to a next bit rate of the second plurality of bit rates is less than a ratio of change from one bit rate to a next bit rate of the first plurality of bit rates.

11. The method recited in claim 9, wherein the information indicative of playback quality comprises at least one of:
one or more first metrics associated with communications between a user device and a gateway at a premises;
one or more second metrics associated with communications between the gateway and a service provider network; or
one or more third metrics associated with a content delivery network.

12. A system comprising:
one or more servers; and
an encoding system configured to:
generate a first bit rate ladder comprising a first plurality of bit rates, wherein the first bit rate ladder has a first ratio between consecutive bit rates of the first plurality of bit rates;
encode content at each of the first plurality of bit rates of the first bit rate ladder;
receive information indicative of a condition associated with the one or more servers configured to transmit the content encoded at one or more of the first plurality of bit rates of the first bit rate ladder; and
based on a determination that the condition satisfies a threshold, generate a second bit rate ladder comprising a second plurality of bit rates, wherein the second bit rate ladder has a second ratio between consecutive bit rates of the second plurality of bit rates that is changed from the first ratio to cause the condition to no longer satisfy the threshold;
encode the content at each of the second plurality of bit rates of the second bit rate ladder; and
monitor the condition associated with the one or more servers configured to transmit the content to determine whether, based on the second bit rate ladder, the condition no longer satisfies the threshold.

13. The system of claim 12, wherein the first plurality of bit rates form a first bit rate ladder, and wherein the second plurality of bit rates form a second bit rate ladder.

14. The system of claim 12, wherein the condition comprises one of a measure of load associated with the one or more servers or a measure of performance associated with the one or more servers.

15. The system of claim 12, wherein the encoding system is further configured to:
generate a first manifest associated with the content, wherein the first manifest comprises information indicative of the first plurality of bit rates; and
based on the determination that the condition satisfies the threshold, generate a second manifest associated with the encoded content, wherein the second manifest comprises information indicative of the second plurality of bit rates.

16. The system of claim 15, wherein the encoding system is further configured to:
send, to the one or more servers, for transmission by the one or more servers to a user device, the first manifest; and
based on the determining that the condition satisfies the threshold, send, to the one or more servers, the second manifest to be used as a replacement for the first manifest.

17. The system of claim 12, wherein the encoding system is further configured to determine the condition satisfies the threshold by determining that the condition exceeds the threshold.

* * * * *